June 12, 1962     A. W. McMURTREY, JR     3,039,089
RADAR SYSTEM
Filed Jan. 27, 1958
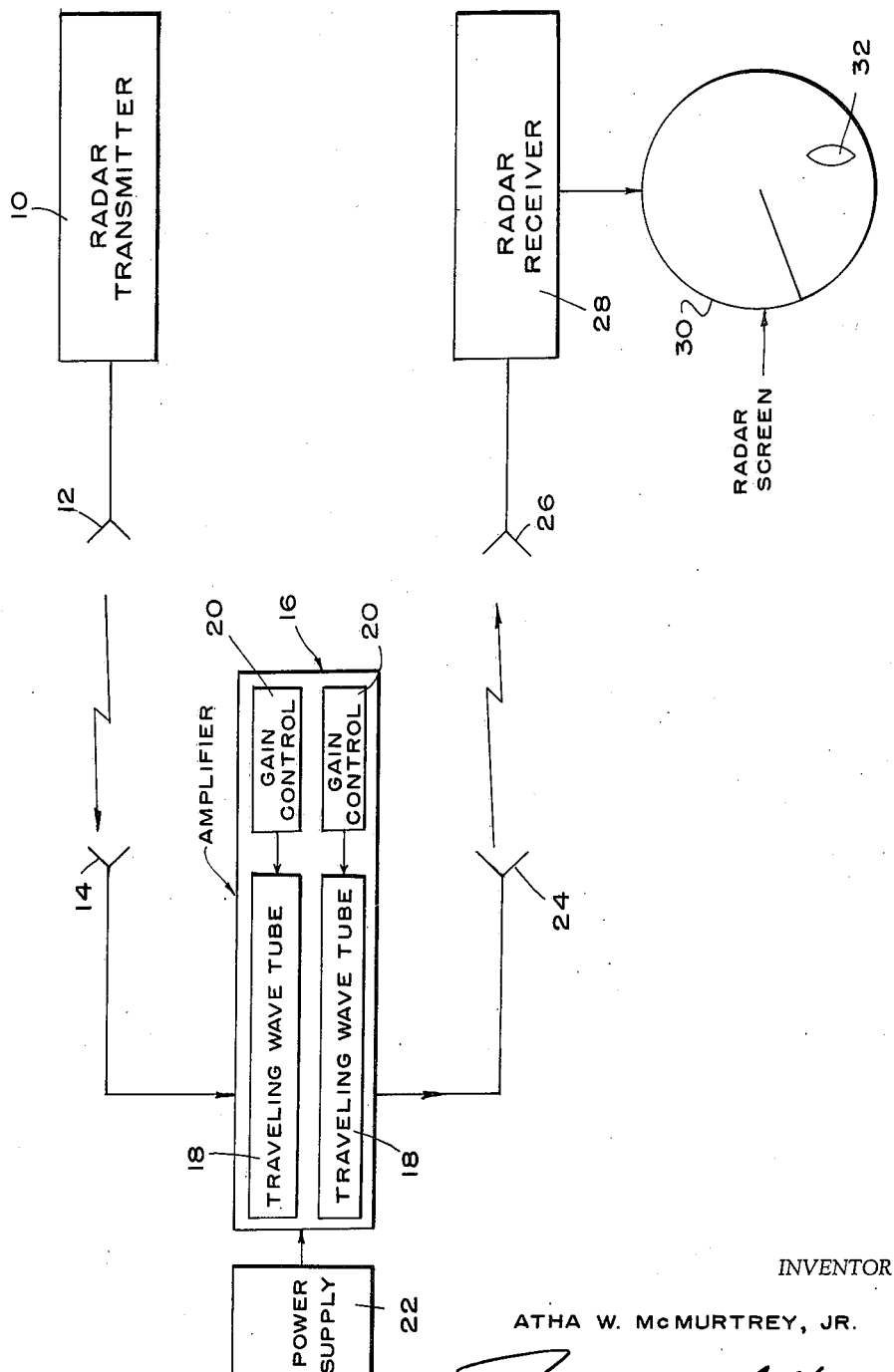
INVENTOR
ATHA W. McMURTREY, JR.
BY *Raymond W Colton*
ATTORNEY 3,039,089
Patented June 12, 1962

1

3,039,089
RADAR SYSTEM
Atha W. McMurtrey, Jr., Garland, Tex., assignor, by mesne assignments, to Temco Electronics & Missiles Company, Dallas, Tex., a corporation of Delaware
Filed Jan. 27, 1958, Ser. No. 711,497
3 Claims. (Cl. 343—5)

This invention relates to a radar system, particularly to a system which includes a remote station comprising a receiving antenna array, a traveling wave tube amplifier and a transmitting antenna array.

There are many applications of radar wherein it would be highly advantageous to increase the apparent size of the image on the radar screen. From the military standpoint, such a possibility is highly desirable in the tracking of a drone, missile, satellite or pilotless plane. Commercially, such a possibility would be valuable in locating aircraft, boats, land vehicles or personnel.

It is among the objects of the present invention to provide an improved radar system which will achieve these advantages in a relatively simple fashion. The radar system contemplated by this invention comprises a radar transmitter having an antenna and a proximate radar receiver having an antenna, and a remote traveling wave tube amplifier having receiving and transmitting antennas cooperating with the first antennas respectively. The traveling wave tube amplifier may include a plurality of traveling wave tubes connected in cascade. Under any circumstances, the traveling wave tube amplifier is preferably provided with an adjustable gain control.

The remote station itself, according to the present invention, comprises a traveling wave tube amplifier having an input circuit including a receiving antenna and an output circuit including a transmitting antenna. The reflectivity pattern of the remote station is preferably designed to equal the product of the patterns of the receiving and transmitting antenna patterns. The radar across section of the remote station is preferably expressed by the equation:

$$\rho = \frac{G_R G_A G_T \lambda^2}{4\pi}$$

where $\rho$ is the radar cross section, $G_R$ the gain of the receiving antenna, $G_A$ the gain of the traveling wave tube amplifier, $G_T$ the gain of the transmitting antenna, and $\lambda$ the wave length.

The system of the present invention will serve to increase the apparent radar reflectivity of any object. The radar reflectivity of an object is proportional to the ratio of the incident power density at the object to the power per unit solid angle reflected back to the source. By virtue of the present invention, any desired cross section can be simulated by receiving the incident radiation, amplifying the received signal and retransmitting it so that it appears to the observer at the radar screen that a target of a particular radar cross section is actually larger than it would appear where conventional equipment is employed.

In accordance with the present invention, the signal received by the remote station will be transmitted with the same modulation as received, without any detectable time delay. In addition, this system will accurately simulate the effect of distance between the illuminating radar transmitter and the target within the dynamic capabilities of the traveling wave tube or tubes of the amplifier.

2

A more complete understanding of the invention will follow from a description based upon the accompanying drawing wherein the single figure is a block diagram.

The illuminating signal is generated by a conventional radar transmitter 10 provided with a transmitting antenna array 12 from which signals are received by a receiving antenna array 14 located at a remote station. The receiving antenna 14 is in the input circuit of an amplifier 16 including one or more traveling wave tubes 18, each equipped with a gain control 20 and provided with a power supply 22. Where more than one traveling wave tube 18 is employed, the tubes will preferably be connected in cascade. The output circuit of the amplifier 16 includes a transmitting antenna array 24 from which signals are received by a receiving antenna array 26 of a radar receiver 28 located at the station at which the illuminating signals are produced by the radar transmitter 10. A viewing screen 30 is connected in circuit with the radar receiver 28 for the production of an image 32. By virtue of the use of the traveling wave tube amplifier at the remote station, the size of the image 32 can be greatly magnified as compared with that produced with existing conventional equipment.

A particular radar cross section can be simulated with this improved system so long as it comes within the limitations of the following equation:

$$\rho = \frac{G_R G_A G_T \lambda^2}{4\pi}$$

where $\rho$ is the radar cross section, $G_R$ the gain of the receiving antenna, $G_A$ the gain of the traveling wave tube amplifier, $G_T$ the gain of the transmitting antenna, and $\lambda$ the wave length.

Thus, in conjunction with the gain of the antennas, the desired cross section can be obtained by adjustment of the gain control of the traveling wave tube or tubes.

The antenna system itself is preferably designed so that the product of the receiving and transmitting antenna patterns defines the desired reflectivity pattern. The antennas of the system may be cross polarized with respect to one another to produce minimum coupling where desired.

Whereas only one specific form of the invention has been illustrated and described, the invention should not be restricted thereto beyond the scope of the appended claims.

I claim:
1. In a radar system for detecting the location of a remote predetermined object and providing an indication of its radar cross-section and including a radar signal transmitter and a radar signal receiver at a station for normally receiving the signals reflected from said object to produce said indication, the improvement comprising means on the object to provide an indication at the station of an increased radar cross-section of the object, said means including at least one travelling wave tube amplifier having a predetermined gain with its input directly coupled to a receiving antenna for receiving transmitted signals from the station and a transmitting antenna directly coupled to the output of the amplifier for retransmitting the amplified signals to the station, said amplifier and antennas being carried by the object, whereby the increased radar cross-section is directly proportional to the gain of the amplifier.

2. A radar system as set forth in claim 1 wherein said amplifier includes a plurality of traveling wave tubes connected in cascade.

3. A radar system as set forth in claim 1 wherein said amplifier is provided with an adjustable gain control for providing the predetermined gain.

References Cited in the file of this patent

UNITED STATES PATENTS

| | | |
|---|---|---|
| 2,042,302 | Frantz | May 26, 1936 |
| 2,459,811 | Grieg | Jan. 25, 1949 |
| 2,708,236 | Pierce | May 10, 1955 |
| 2,733,305 | Diemer | Jan. 31, 1956 |
| 2,735,933 | Pierce | Feb. 21, 1956 |

FOREIGN PATENTS

| | | |
|---|---|---|
| 652,653 | Great Britain | Apr. 25, 1951 |

OTHER REFERENCES

"Radar Beacons," by Roberts, M.I.T. Rad. Labs. Series, vol. 3, McGraw-Hill Book Co., N.Y., 1947, p. 3.